United States Patent [19]
Swars

[11] Patent Number: 5,211,012
[45] Date of Patent: May 18, 1993

[54] CATALYTIC CONVERTER HOUSING, PARTICULARLY FOR STARTING CATALYTIC CONVERTERS, AND ASSOCIATED CATALYST CARRIER BODY

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 661,489

[22] Filed: Feb. 26, 1991

[30] Foreign Application Priority Data

Aug. 26, 1988 [DE] Fed. Rep. of Germany ... 8810816[U]

[51] Int. Cl.⁵ .............................................. F01N 3/28
[52] U.S. Cl. ........................................ 60/295; 55/481; 60/299; 422/168; 422/180
[58] Field of Search .................... 60/295, 299, 288; 422/180, 168; 55/481

[56] References Cited

U.S. PATENT DOCUMENTS

| | | | |
|---|---|---|---|
| 3,441,382 | 4/1969 | Keith | 422/180 |
| 3,644,098 | 2/1972 | De Palma | 60/299 |
| 3,817,031 | 6/1974 | Goto et al. | |
| 3,963,447 | 6/1976 | Hayashi | |
| 3,972,685 | 8/1976 | Hanaoka | |
| 4,032,310 | 6/1977 | Ignoffo | |
| 4,457,141 | 7/1984 | Yoshioka | |

FOREIGN PATENT DOCUMENTS

| | | |
|---|---|---|
| 316934 | 11/1973 | Austria . |
| 0136515 | 4/1985 | European Pat. Off. . |
| 0159468 | 10/1985 | European Pat. Off. . |
| 0220468 | 5/1987 | European Pat. Off. . |
| 0245737 | 11/1987 | European Pat. Off. . |
| 0245738 | 11/1987 | European Pat. Off. . |
| 1175713 | 8/1964 | Fed. Rep. of Germany ........ 55/481 |
| 2040584 | 2/1972 | Fed. Rep. of Germany . |
| 97920 | 5/1973 | Fed. Rep. of Germany . |
| 2247947 | 4/1974 | Fed. Rep. of Germany . |
| 2420678 | 11/1975 | Fed. Rep. of Germany . |
| 3328205 | 2/1985 | Fed. Rep. of Germany . |
| 3629945 | 10/1987 | Fed. Rep. of Germany . |
| 1289928 | 9/1972 | United Kingdom . |

OTHER PUBLICATIONS

Patent Abstract of Japan, vol. 9, No. 275 (M-426) (1998) Nov. 2, 1985: JP-A-60-119314, Jun. 26, 1985.

*Primary Examiner*—Douglas Hart
*Attorney, Agent, or Firm*—Herbert L. Lerner; Laurence A. Greenberg

[57] ABSTRACT

A housing assembly includes a catalyst carrier body having a given cross section, a given maximum length and a given maximum width. A housing has an interior and a cross section being larger than the given cross section. The housing has an approximately rectangular opening formed therein with a length being greater than the given maximum length and a width being greater than the given maximum width. A flat or curved retaining plate is secured to the catalyst carrier body and has a greater length and a greater width than the opening for closing the housing like a lid with the catalyst carrier body protruding into the interior of the housing. A device is provided on the housing and/or the retaining plate for fastening the housing and the retaining plate to each other.

5 Claims, 2 Drawing Sheets

CATALYTIC CONVERTER HOUSING, PARTICULARLY FOR STARTING CATALYTIC CONVERTERS, AND ASSOCIATED CATALYST CARRIER BODY

CROSS-REFERENCE TO RELATED APPLICATION

This is a continuation of International Application PCT/EP89/00818, filed Jul. 14, 1989.

The invention relates to a housing having a catalyst carrier body for motor vehicles, especially for a catalytic converter installed near the engine, or so-called starting catalytic converter.

Metal carrier bodies are generally used for catalytic converters that are subject to major thermal strains, as described, for instance, in European Patent No. 0 136 515 B1; and Published European Application Nos. 0 159 468 A2; 0 220 468 A1 corresponding to U.S. Pat. No. 4,818,746; 0 245 737 A1 corresponding to U.S. Pat. Nos. 4,923,109 and 4,832,998; and 0 245 738 A1 corresponding to U.S. Pat. Nos. 4,803,189 and 4,946,822. Metal catalyst carrier bodies are typically made of structured metal sheets that form a honeycomb body, which has a great number of flow channels through which the exhaust gas can pass. The structured metal sheets are disposed inside a jacket tube or a closed housing, which is joined to the rest of the exhaust system with flanges or welded ends. Such a structure is not necessarily optimal for starting catalytic converters disposed especially close to the outlet of an engine, because the housing cannot be manufactured at favorable cost, and there are also space problems and problems when connecting it to the exhaust manifold, which is usually a casting. If flow baffles which pass the gases through the catalytic converter or cause them to bypass it depending on the temperature of the stream of exhaust gas are also to be provided, then the prior art housing structures are no longer suitable. Catalytic converters are also known to first suffer damage on the upstream side thereof facing directly into the flow of exhaust gas, which can result in a decreasing conversion rate, since the upstream region of the catalytic converter contributes the most to the conversion.

It is accordingly an object of the invention to provide a catalytic converter housing, particularly for starting catalytic converters, and an associated catalyst carrier body, which overcomes the hereinafore-mentioned disadvantages of the heretofore-known devices of this general type, which is economical to manufacture, durable, and moreover allows later replacement or turning of a catalytic converter.

With the foregoing and other objects in view there is provided, in accordance with the invention, a housing assembly, especially for a motor vehicle catalytic converter installed near the engine, comprising a catalyst carrier body having a given cross section, a given maximum length and a given maximum width; a housing having an interior and having a cross section being larger than the given cross section; the housing having an approximately rectangular opening formed therein with a length being greater than the given maximum length and a width being greater than the given maximum width; a flat or curved retaining plate being secured to the catalyst carrier body and having a greater length and a greater width than the opening for closing the housing like a lid with the catalyst carrier body protruding into the interior of the housing; and means disposed on the housing and/or on the retaining plate for fastening the housing and the retaining plate to each other.

A catalyst carrier body that is secured to a retaining plate is received in such a housing, which is part of an exhaust gas line, through an opening in the housing, and the catalyst carrier body tightly closes the opening once it has been installed.

This housing construction, in which a catalytic converter can be pushed in and pulled out more or less like a drawer, has many advantageous structural options, some of which are mentioned below.

In accordance with another feature of the invention, the housing along with the catalyst carrier body, except for the lid, is manufactured as a cast part, preferably including an alloy typical for exhaust lines in motor vehicle engines. This option is decisive in terms of production cost. Cast parts of this kind have proved useful in many ways in the region near the engine in motor vehicle exhaust systems and they can be connected to the remainder of the exhaust system in the conventional manner with flanges.

In accordance with a further feature of the invention, the housing has ends, and at least one flange on at least one of the ends for connection to at least one further exhaust gas line segment.

In accordance with an added feature of the invention, the housing has two ends, flanges each being disposed on a respective one of the ends for connection to at least one further exhaust gas line segment, and a bellied portion disposed between the flanges.

Although catalytic converters have by now achieved a long service life, nevertheless the service life of starting catalytic converters may sometimes be shorter than that of the remainder of the exhaust system. In the housings according to the invention, the catalytic converters can easily be replaced in the course of routine maintenance. The service life can be virtually doubled under some circumstances merely by turning a catalyst carrier body around, so that the virtually undamaged downstream end can take over the former function of the upstream end. Therefore, in accordance with an additional feature of the invention, there are provided means for interchanging the catalyst carrier body along with the retaining plate and for permitting the catalyst carrier body along with the retaining plate to be turned.

In accordance with yet another feature of the invention, the cross section of the housing is only slightly larger than the given cross section of the catalyst carrier body.

Since starting catalytic converters near the engine are most effective in the cold-starting phase of a motor vehicle, structures exist in which the catalytic converter experiences a flow of exhaust gas through it only in this phase, while it is bypassed during later operation. A housing according to the invention offers the option of providing an unobstructed cross section for bypassing the catalytic converter located beside the catalyst carrier body. Therefore, in accordance with yet a further feature of the invention, there is provided at least one flow baffle, such as a bimetallic flap, disposed in the housing for switching between a flow path through the catalyst carrier body and a flow path bypassing the catalyst carrier body as a function of temperature, the cross section of the housing being larger than the given cross section of the catalyst carrier body by a distance permitting accommodation of the at least one flow baffle in the housing.

In accordance with yet an added feature of the invention, the at least one flow baffle is secured to the catalyst carrier body or to the retaining plate. In accordance with yet an additional feature of the invention, the at least one flow baffle is insertable and removable through the opening in the housing, optionally together with the catalyst carrier body through the opening in the housing. If such flow baffles are secured to the catalyst carrier body or its retaining plate, then both can be inserted and replaced jointly.

In accordance with again another feature of the invention, the at least one flow baffle is secured on the housing. In this way, the catalytic converter alone can be replaced or rotated.

With the objects of the invention in view, there is also provided a catalyst carrier assembly, comprising a metal catalyst carrier body for installation in a housing, the catalyst carrier body having a metal jacket tube. Either a retaining plate is provided to which the metal jacket tube is secured, or the metal jacket tube has an extended portion forming a retaining plate. The extended portion may be a lengthened portion or a widened portion.

Catalyst carrier bodies that are particularly suitable for installation in housings according to the invention will be described in further detail while referring to the drawing. In principle, virtually all cross-sectional shapes are suitable for installation in suitably shaped housings according to the invention. For instance, in accordance with another feature of the invention, the catalyst carrier body has an approximately semi-circular or semi-oval cross section with a flat side forming the extended portion with the retaining plate. Catalyst carrier bodies with a round cross section may also be provided with a retaining plate, as can catalyst carrier bodies with an approximately semicircular or semi-oval cross section. The essential factor is that a catalyst carrier body fill the cross section of the housing as completely as possible, as long as no bypass of the catalytic converter body is provided. If a bypass that is to be opened as a function of temperature is provided, then naturally the catalyst carrier body need fill only a portion of the housing cross section.

In accordance with a further feature of the invention, the catalyst carrier body is symmetrical with respect to a plane located at right angles to a flow direction through the catalyst carrier body, whereby the catalyst carrier body is insertable in a given housing in two positions being rotated through 180° relative to one another.

For exhaust systems having two or more parallel pipes, a corresponding number of housings according to the invention can be disposed side by side, in such a way that the associated catalytic converters can be secured to a common retaining plate and manipulated jointly. Therefore, in accordance with a concomitant feature of the invention, there is provided at least one other catalyst carrier body with a retaining plate, the catalyst carrier bodies being combined into a unit for joint manipulation in a multiple-pipe exhaust system.

Other features which are considered as characteristic for the invention are set forth in the appended claims.

Although the invention is illustrated and described herein as embodied in a catalytic converter housing, particularly for starting catalytic converters, and and associated catalyst carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
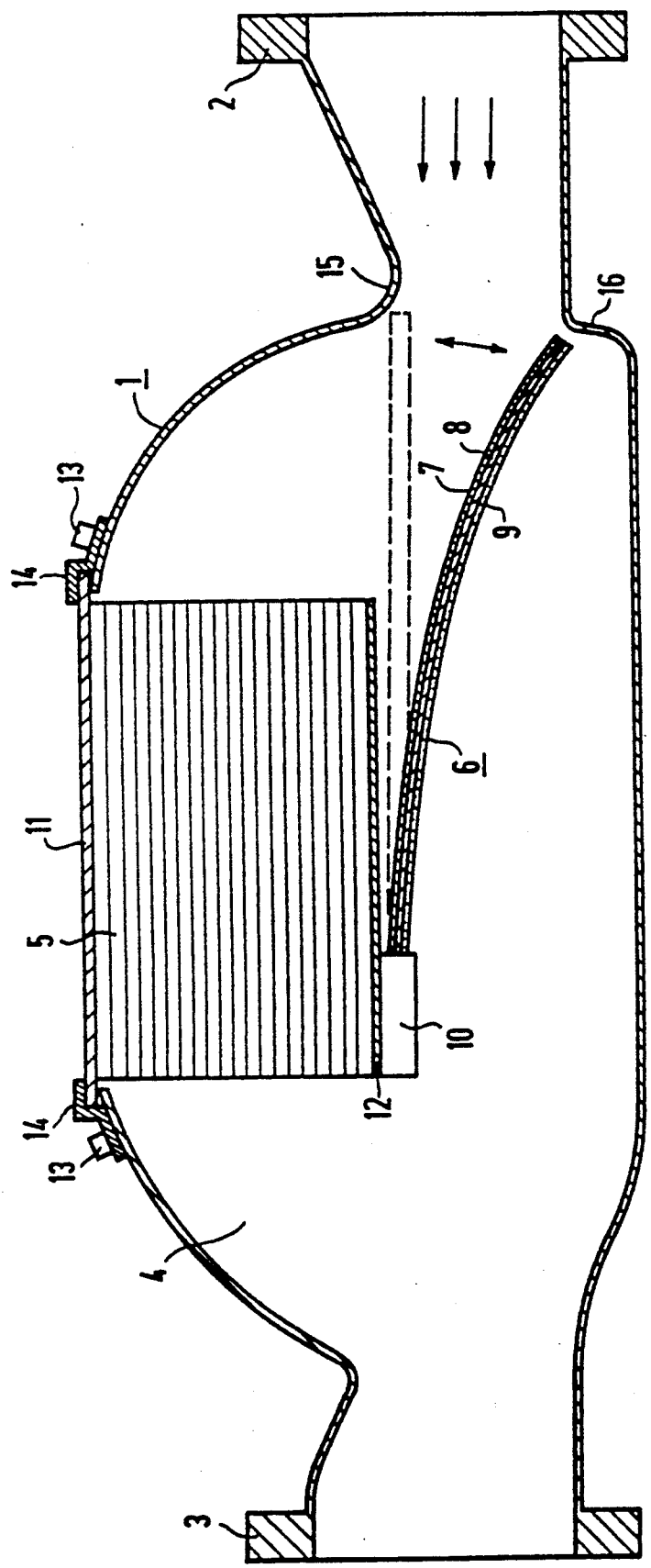
FIG. 1 is a diagrammatic, longitudinal-sectional view of a housing according to the invention having a catalytic converter that can be bypassed as a function of temperature.

Referring now to the figures of the drawing in detail and first, particularly, to FIG. 1 thereof, there is seen a bellied or bulging housing 1 according to the invention, with flanges 2, 3 at both ends. An unobstructed cross section 4 in the bellied region of the housing 1 is only partly filled by a catalyst carrier body 5. The catalyst carrier body 5 is secured to a retaining plate 11 and has a jacket tube 12. An upper region of the housing 1 has an opening corresponding to the shape of the catalyst carrier body 5. The opening is closed by the retaining plate 11 in the manner of a lid. For this purpose, the retaining plate 11 is fixed relative to the housing 1 by fastening means 13, 14. A bimetallic flap 6, which includes at least two layers of metal 7, 8 having different thermal expansion coefficients and is also optionally provided with a thermal insulator 9, is secured by a retainer 10 to the jacket tube 12 of the catalyst carrier body 5. The bimetallic flap 6 is located in the position shown when in the cold state, so that it cooperates with a bulge 16 of the housing 1 to deflect exhaust gas approaching it as indicated by arrows, toward the catalyst carrier body. In the cold state, the great majority of the exhaust gas therefore flows through the catalyst carrier body. However, as the bimetallic flap 6 warms up, it moves in the direction indicated by another arrow into the position shown in broken lines. The bimetallic flap 6 thus maximally shields the catalyst carrier body 5 from hot exhaust gas in cooperation with a shaped portion 15 of the inlet side of the housing. The catalyst carrier body 5 is easily replaceable together with the bimetallic flap 6.

Figure 2:
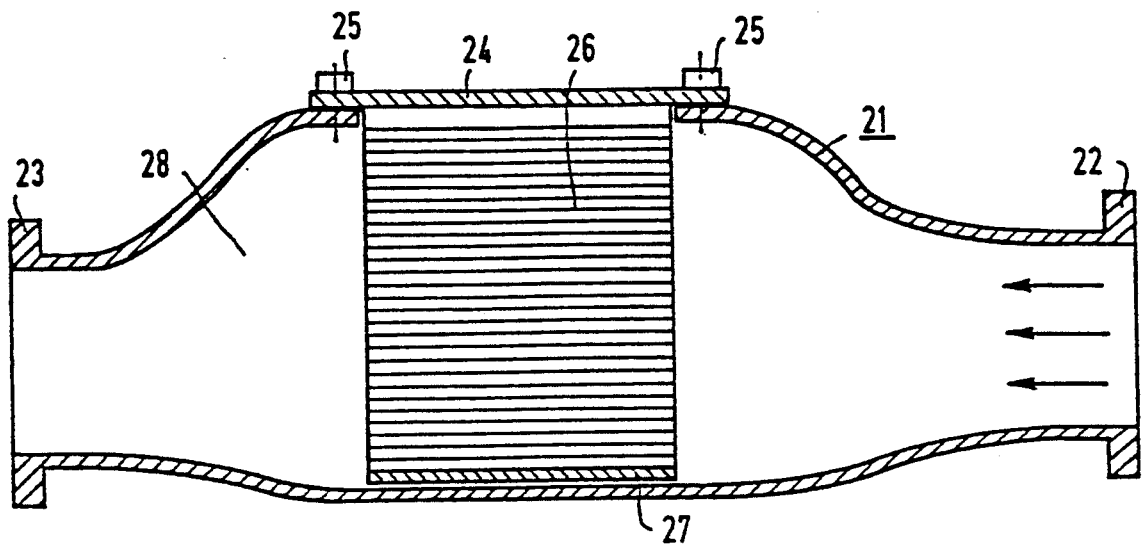
FIG. 2 is a longitudinal-sectional view of a housing having a catalytic converter that cannot be bypassed.
Figure 3:
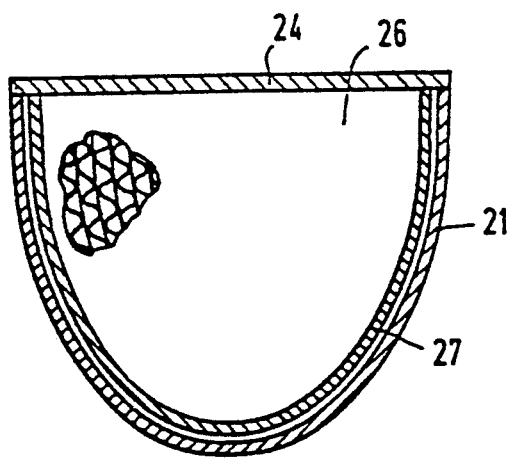
FIG. 3 is a cross-sectional view taken through the region of the catalytic converter of FIG. 2.

FIGS. 2 and 3 show a housing 21 having a bellied or bulging cross section 28 which is filled as completely as possible with an inserted catalyst carrier body 26. The housing 21 has flanges 22, 23 on both ends, with the aid of which it can be installed in an exhaust system. In the present exemplary embodiment, both the catalyst carrier body 26 and the housing 21 have a semi-oval cross section. The catalyst carrier body 26 is surrounded by a jacket tube having sides 24, 27. The side 24 of the jacket tube is flat and is constructed as a lid for an opening in the housing 21, through which the catalyst carrier body 26 protrudes into the interior. The side or lid 24 is secured to the housing 21 by means of screws 25.

Housings according to the invention and the associated catalyst carrier body can be manufactured independently from one another and at an advantageous cost and offer considerable advantages, especially for installation near the engine.

I claim:

1. A catalyst carrier assembly, comprising a metal catalyst carrier body for installation in a housing, said catalyst carrier body having a metal jacket tube, said metal jacket tube having an extended portion forming a retaining plate, and said catalyst carrier body having an approximately semi-circular or semi-oval cross section with a flat side forming said extended portion with said retaining plate.

2. The catalyst carrier assembly according to claim 1, wherein said extended portion is a lengthened portion.

3. The catalyst carrier assembly according to claim 1, wherein said extended portion is a widened portion.

4. The catalyst carrier assembly according to claim 1, wherein said catalyst carrier body is symmetrical with respect to a plane located at right angles to a flow direction through said catalyst carrier body, whereby said catalyst carrier body is insertable in a given housing in two positions being rotated through 180° relative to one another.

5. The catalyst carrier assembly according to claim 1, including at least one other catalyst carrier body with a retaining plate, said catalyst carrier bodies being combined into a unit for joint manipulation in a multiple-pipe exhaust system.

* * * * *